US010175264B2

(12) United States Patent
Arai et al.

(10) Patent No.: US 10,175,264 B2
(45) Date of Patent: Jan. 8, 2019

(54) DATA DISPLAY PROCESSING DEVICE, DATA DISPLAY PROCESSING METHOD AND CONTROL PROGRAM FOR SCANNING PROBE MICROSCOPE

(71) Applicant: SHIMADZU CORPORATION, Kyoto-shi, Kyoto (JP)

(72) Inventors: Hiroshi Arai, Kyoto (JP); Masahiro Ohta, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 53 days.

(21) Appl. No.: 15/528,217

(22) PCT Filed: Nov. 21, 2014

(86) PCT No.: PCT/JP2014/080965
§ 371 (c)(1),
(2) Date: May 19, 2017

(87) PCT Pub. No.: WO2016/079879
PCT Pub. Date: May 26, 2016

(65) Prior Publication Data
US 2017/0322234 A1   Nov. 9, 2017

(51) Int. Cl.
*G01Q 30/04* (2010.01)
*G06T 11/20* (2006.01)
(Continued)

(52) U.S. Cl.
CPC .......... *G01Q 30/04* (2013.01); *G06F 3/0482* (2013.01); *G06F 3/04845* (2013.01); *G06T 11/206* (2013.01)

(58) Field of Classification Search
CPC ........ G01Q 30/04; G01Q 30/06; G01Q 10/00; G01Q 60/00; G06F 3/0482; G03F 3/04845; G06T 11/206
(Continued)

(56) References Cited

U.S. PATENT DOCUMENTS

2002/0043611 A1* 4/2002 Yoshikawa .............. H01L 27/00
250/208.1
2008/0316549 A1* 12/2008 Bush, III ........... H04N 1/00681
358/488
2013/0222775 A1* 8/2013 Nishimura ........... H04N 9/3135
353/85

FOREIGN PATENT DOCUMENTS

JP 05-157554 A 6/1993

OTHER PUBLICATIONS

Written Opinion dated Feb. 24, 2015 in application No. PCT/JP2014/080965.
(Continued)

*Primary Examiner* — Nicole Ippolito
(74) *Attorney, Agent, or Firm* — Sughrue Mion, PLLC

(57) ABSTRACT

A data display processing device for a scanning probe microscope includes: a group information storage unit for managing and storing a plurality of measurement data sets; specified data acquisition means for acquiring, from the storage unit, a specified measurement data set; display controlling means for displaying the specified data set as an image; preliminary image generation means for, triggered by determination of the specified data set, acquiring other measurement data set or sets belonging to a group including the specified data set from the group information storage unit, and generating a preliminary image which is an image or images which will be used when displaying the other measurement data set or sets; and first display switching means for switching to display the preliminary image within
(Continued)

a predetermined region in response to a first predetermined input operation by the user performed while the specified data set is displayed.

8 Claims, 9 Drawing Sheets

(51) Int. Cl.
*G06F 3/0482* (2013.01)
*G06F 3/0484* (2013.01)

(58) Field of Classification Search
USPC .................................................. 850/11, 8, 10
See application file for complete search history.

(56) References Cited

OTHER PUBLICATIONS

"SPM-9700 Catalog", Shimadzu Corporation, Dec. 1, 2010, pp. 8-15.

* cited by examiner

DATA DISPLAY PROCESSING DEVICE, DATA DISPLAY PROCESSING METHOD AND CONTROL PROGRAM FOR SCANNING PROBE MICROSCOPE

CROSS REFERENCE TO RELATED APPLICATIONS

This application is a National Stage of International Application No. PCT/JP2014/080965, filed Nov. 21, 2014, the contents of which are incorporated herein by reference in its entirety.

TECHNICAL FIELD

The present invention relates to a data display processing device for a scanning probe microscope that processes measurement data acquired by a scanning probe microscope (SPM) such as an atomic force microscope (AFM), specifically, data showing a distribution of various physical quantities, and displays an image according to the data.

BACKGROUND ART

An SPM, typically an AFM, is used to observe the state of a sample surface while scanning the sample surface with a probe provided at a free end of a cantilever which is, generally, vibrated in the vertical (z axis) direction, wherein the sample is placed on a stage movable in horizontal (xy-plane) and vertical directions (for example, see Patent Literature 1).

The kinds of information observable relating to a sample surface with a conventional SPM include the shape (concavities and convexities) of the surface and various physical properties (viscoelasticity, adsorbability, electrical conductivity, magnetic susceptibility and the like). Data analysis software (simply referred to as "analysis software") generates respective measurement data sets for each of these kinds of information (for example, see Non Patent Literature 1). Further, since these measurement data sets are generated for each direction during reciprocating scanning, a large number of measurement data sets relating to a single sample are obtained by one measurement. These measurement data sets are managed as a group by the aforementioned analysis software. An example of a screen display by analysis software for SPM data is shown in FIG. 10.

CITATION LIST

Patent Literature

[Patent Literature 1] JP 5-157554 A

Non Patent Literature

[Non Patent Literature 1] "SPM-9700 Catalog", Shimadzu Corporation, Dec. 1, 2010, pp. 8-15

SUMMARY OF INVENTION

Technical Problem

If, in using the analysis software, a user desires to display a plurality of measurement data sets in a group as respective images on a screen, it is necessary for the user to explicitly specify the plurality of measurement data sets. Here, the term "explicitly specify" includes both individually selecting each of the plurality of measurement data sets and selecting the plurality of measurement data sets in one batch.

A specific example will now be described with reference to FIG. 10A. In FIG. 10A, in a window named "data selection screen", a plurality of groups are displayed corresponding to respective samples, and one or a plurality of measurement data sets are displayed in thumbnail form for each of the groups. When the user wants to view in detail two or more measurement data sets from a group that includes a number of measurement data sets as in the case of "sample 4", the user performs either one of the following two operations. One is a double-click operation on a thumbnail of a measurement data set. This operation is performed individually for each of the desired measurement data sets. The other operation is to move the cursor while holding down the left button of the mouse to define a rectangular region that covers the thumbnails of the desired plurality of measurement data sets. When the left button (or accompanying a predetermined shortcut key operation) is released, the plurality of thumbnails are provisionally selected. Then an instruction is given to display the selected thumbnails by performing a right click operation or the like. The plurality of measurement data sets specified in this manner are displayed in a window named "data display screen" as shown in FIG. 10B as images having a predetermined resolution (for example, 512×512 pixels). The plurality of images are shown individually (for example, in respective windows as shown in FIG. 10B).

However, in the case of the former of the two operations described above, it is necessary for the user to alternately look at the data selection screen and the data display screen. In that case, depending on the resolution of the monitor, it is necessary to frequently switch the display window. Therefore, in the case of the former operation, the user needs to move the gazing point and the cursor frequently, which is troublesome and tiring. Further, with respect to the latter operation, in a case where a plurality of measurement data sets are once displayed inside the data display screen by a batch specification, and thereafter the user desires to additionally display another measurement data set in the group, it is necessary for the user to again perform an operation to specify the additional measurement data set, which causes the same problem as above.

Further, the above described conventional configuration is based on the premise that, when specifying measurement data sets, the user correctly recognizes the contents of the measurement data sets. However, not only original measurement data sets obtained by measurement, but also measurement data sets that have undergone various kinds of editing such as correction with respect to the original measurement data sets are also added and included within a group. Accordingly, depending on the purpose of the user, there are cases in which a vast number of measurement data sets are included in a group. Furthermore, in a case where measurement data sets have a similar appearance before editing and after editing, it is difficult to distinguish a desired measurement data set based on a thumbnail that is displayed on a data selection screen. At such time, if the user does not appropriately recognize the file name or the like of the target measurement data set, the user must select and display all measurement data sets whose thumbnails have similar appearances, either in sequence or in a batch in order to find the target measurement data set. Naturally the former operation is troublesome, and even in the latter case, an operation to find the target measurement data set from among a large number of windows displayed in the data display screen inevitably involves frequent switching of windows, which is quite inconvenient to the user.

The present invention has been made in consideration of the above described circumstances, and an object of the present invention is to provide a data display processing device, method and program for a scanning probe microscope which, when displaying measurement data sets representing various physical quantities obtained by an SPM as images on a screen of a display unit, enable easy viewing of a plurality of measurement data sets without the user's troublesome operations.

Solution to Problem

The first invention made to solve the problems described above is a data display processing device for a scanning probe microscope that, based on a plurality of measurement data sets that show respective distributions of predetermined physical quantities acquired using a scanning probe microscope, creates a plurality of images that show the distributions of the physical quantities and displays the images on a screen of a display unit, including:

a) a group information storage unit for managing and storing a plurality of measurement data sets by group;

b) specified data acquisition means for acquiring, from the group information storage unit, a specified data set which is a measurement data set specified by a user;

c) display controlling means for displaying the specified data set acquired by the specified data acquisition means as an image on the screen;

d) preliminary image generation means for, triggered by a determination of the specified data set, acquiring other measurement data set or sets belonging to a group in which the specified data set acquired by the specified data acquisition means is included from the group information storage unit, and generating a preliminary image or images which will be used when displaying the other measurement data set or sets on the screen; and e) first display switching means for switching to display the preliminary image generated by the preliminary image generation means within a predetermined region on the screen in response to a first predetermined input operation by the user performed while the specified data set is displayed on the screen.

In this case, the "first predetermined input operation by the user" includes rotation of a mouse wheel and pressing of a direction key or an "Enter" key. Further, to prevent unwanted switching of display, a configuration may be adopted in which switching of the display is not performed during normal operation even if the above described input operation is detected, and which, upon the occurrence of a predetermined trigger event, transitions to a preliminary image switching mode that switches the display in response to the aforementioned input operation. The predetermined trigger event includes a double-click operation inside a display region of the specified data set or simultaneous depression of multiple keys.

As another example, a mark such as an arrow may be displayed in advance inside a display region of the specified data set (for example, in the vicinity of the left and right edges), and switching of the image may be performed when a click operation (first predetermined input operation) on the mark is detected.

According to the above described configuration, when a specific measurement data set among a plurality of measurement data sets belonging to a certain group is specified by a user, the specified data acquisition means acquires the measurement data set (specified data set) from the group information storage unit. The specified data set acquired by the specified data acquisition means is displayed on the screen of the display unit as normal by the display controlling means. The preliminary image generation means acquires another measurement data set in the group to which the specified data set belongs, and generates, as a preliminary image, an image to be displayed when displaying the acquired measurement data set as an image on the screen of the display unit. When the user performs the first predetermined input operation while the aforementioned specified data set is being displayed on the screen, the preliminary image generated by the preliminary image generation means is switched to be displayed within a predetermined region on the screen by the first display switching means.

By this means, the user can switch between the measurement data set specified as a display object and another measurement data set belonging to the same group as the specified measurement data set on the screen and view them as though channel zapping on television (hereunder, this switching and viewing operation is referred to as "zapping"). Therefore, the user needs not significantly move the user's gazing point, and thus troublesome operations are minimized. Further, rapid switching is enabled by creating the display image of the aforementioned other measurement data set or sets as a preliminary image or images in advance. In addition, for example, by adopting the preliminary image that is switched to and displayed as an initial specific form when displaying each measurement data set on the screen, there is also the advantage that it is easy to identify desired measurement data from among the preliminary images (for example, by referring to the thumbnails in the data selection screen illustrated in FIG. 10A).

The number of measurement data sets specified by a user (that is, specified data sets) may be one or plural. Further, a preliminary image need not be generated for all of the other measurement data sets belonging to the same group as the specified data set. For example, in a case where a pre-editing data set and/or a post-editing data set exists with respect to a specified data set, a preliminary image may be generated only for a measurement data set (and the original data set) created based on the same original data set.

The preliminary image generation means may be configured to acquire all other measurement data sets belonging to the group in which the specified data set is included.

By this means, after the user specifies a certain measurement data set, by performing the aforementioned first predetermined input operation it is possible to view all measurement data sets belonging to the same group by switching the display of measurement data sets. According to conventional configuration, if there is a large number of measurement data sets in a group and the user is not aware of one of the measurement data sets, the user may overlook the measurement data set on a data selection screen (that is, a list of thumbnail images) as shown in FIG. 10A. Whereas, according to the present invention, by zapping through the preliminary images as described above, the user will not overlook the presence of the measurement data set. Hence, the present invention contributes to preventing and correcting misrecognition of the kinds and number of measurement data sets by a user.

Preferably, the predetermined region is a region in which the display controlling means displays the specified data set as an image.

By this means, the movement of the user's gazing point is further reduced.

Preferably, the display controlling means further displays the other measurement data set linked with the preliminary image as an image in a region that is different from a display region of the specified data set in response to a confirmation operation by the user that is performed while the preliminary image is displayed.

According to the above described configuration, the user can cause a desired measurement data set to be displayed in the region different from that of the specified data set through the confirmation operation, and can compare the measurement data set and specified data set on the screen. A preferable specific example of the present configuration may be a form in which the specified data set and the measurement data set after the confirmation operation are displayed in different windows (similar to FIG. 10B).

Preferably, the first display switching means further attaches information pertaining to each measurement data set to the preliminary image so as to display it.

The term "information pertaining to a measurement data set" refers to, for example, a file name, a kind, a scanning direction as well as the kinds and number of editing processes or the like.

By this means, while zapping through the measurement data sets in the group, the user can recognize in detail the contents of each measurement data set, and thus such configuration further contributes to identification of the desired measurement data set.

Preferably, the data display processing device for the scanning probe microscope further includes:

f) a display format storage unit for linking one or a plurality of display formats displayable based on each of the plurality of the measurement data sets with each of the measurement data sets and storing them;

g) format-based preliminary image generation means for referring to the display format storage unit and, from among the display formats linked with the specified data set, identifying a display format currently not displayed on the screen or not instructed for displaying, and generating a format-based preliminary image that is an image that is used when displaying the specified data set in the identified display format; and h) second display switching means for, in response to a second predetermined input operation by the user that is performed while the specified data set is displayed on the screen, switching to display, in the predetermined region on the screen, the format-based preliminary image generated by the format-based preliminary image generation means.

In this case, the "second predetermined input operation by the user" may be the same as the aforementioned first predetermined input operation, or a different operation may be assigned as the second predetermined input operation from among the operations exemplified above as the first predetermined input operation. According to the present configuration also, when transiting to a mode for switching a display format based on a predetermined trigger event, in order to avoid confusion with the above described preliminary image switching mode, a different operation (for example, an operation in which a key to be pressed is different) can be taken as the trigger event.

Further, in a case where a mark that accepts a click operation is displayed inside the display region of the specified data set also, a configuration may be adopted that allows the user to know the type of the switching object (measurement data/display format) by changing the mark from a mark that is used for a time of switching measurement data set.

According to the above described configuration, the format-based preliminary image generation means generates a format-based preliminary image relating to specified data set based on information stored in the display format storage unit. If the user performs the second predetermined input operation during display of the specified data set on the screen, the second display switching means switches the image to display format-based preliminary image screen. Because this allows the user to zap images of a plurality of display formats relating to the specified data set, for example, even a user who is unfamiliar with operation of analytical software can visually identify an intended format which contributes to improvement in usability.

The second invention made to solve the problems described above is a data display processing method for a scanning probe microscope that, based on a plurality of measurement data sets that show respective distributions of predetermined physical quantities acquired using a scanning probe microscope, creates a plurality of images that show the distributions of the physical quantities and displays the images on a screen of a display unit, the method including:

a) a specified data acquisition step of acquiring a specified data set which is a measurement data set specified by a user, from a group information storage unit for managing and storing a plurality of measurement data sets for each group;

b) a preliminary image generation step of, triggered by a determination of the specified data set, acquiring other measurement data set or sets belonging to a group in which the specified data set that is acquired in the specified data acquisition step is included from the group information storage unit, and generating a preliminary image which is an image or images which will be used when displaying the other measurement data set or sets on the screen;

c) a display control step of displaying the specified data set acquired in the specified data acquisition step as an image on the screen; and d) a display switching step of switching to display the preliminary image generated in the preliminary image generation step in a predetermined region on the screen in response to a first predetermined input operation by the user performed while the specified data set is displayed on the screen.

Advantageous Effects of Invention

According to the present invention, when measurement data sets showing various physical quantities acquired by an SPM are displayed as images on a screen of a display unit, the user can easily view a plurality of measurement data sets without a troublesome operation.

BRIEF DESCRIPTION OF DRAWINGS

FIG. 6A and FIG. 6B illustrate examples of screen displays in the data switching mode illustrated in FIG. 5A, FIG. 5B, and FIG. 5C, in which FIG. 6A illustrates an example of a screen display in a case where a confirmation operation is performed by a user, and FIG. 6B illustrates an example of a screen display in a case where an operation to end the data switching mode is performed by the user after the confirmation operation illustrated in FIG. 6A.

FIG. 10A and FIG. 10B illustrate examples of screen displays, in which FIG. 10A illustrates a display example of a measurement data selection screen generated by conventional SPM data analytical software, and FIG. 10B illustrates a display example of a specified data display screen.

DESCRIPTION OF EMBODIMENTS

Hereunder, embodiments for carrying out the present invention are described in detail with reference to the accompanying drawings. In the following descriptions, members having the same functions as in drawings already described are denoted by the same reference signs, and a description thereof is omitted.

[First Embodiment]

Figure 1:
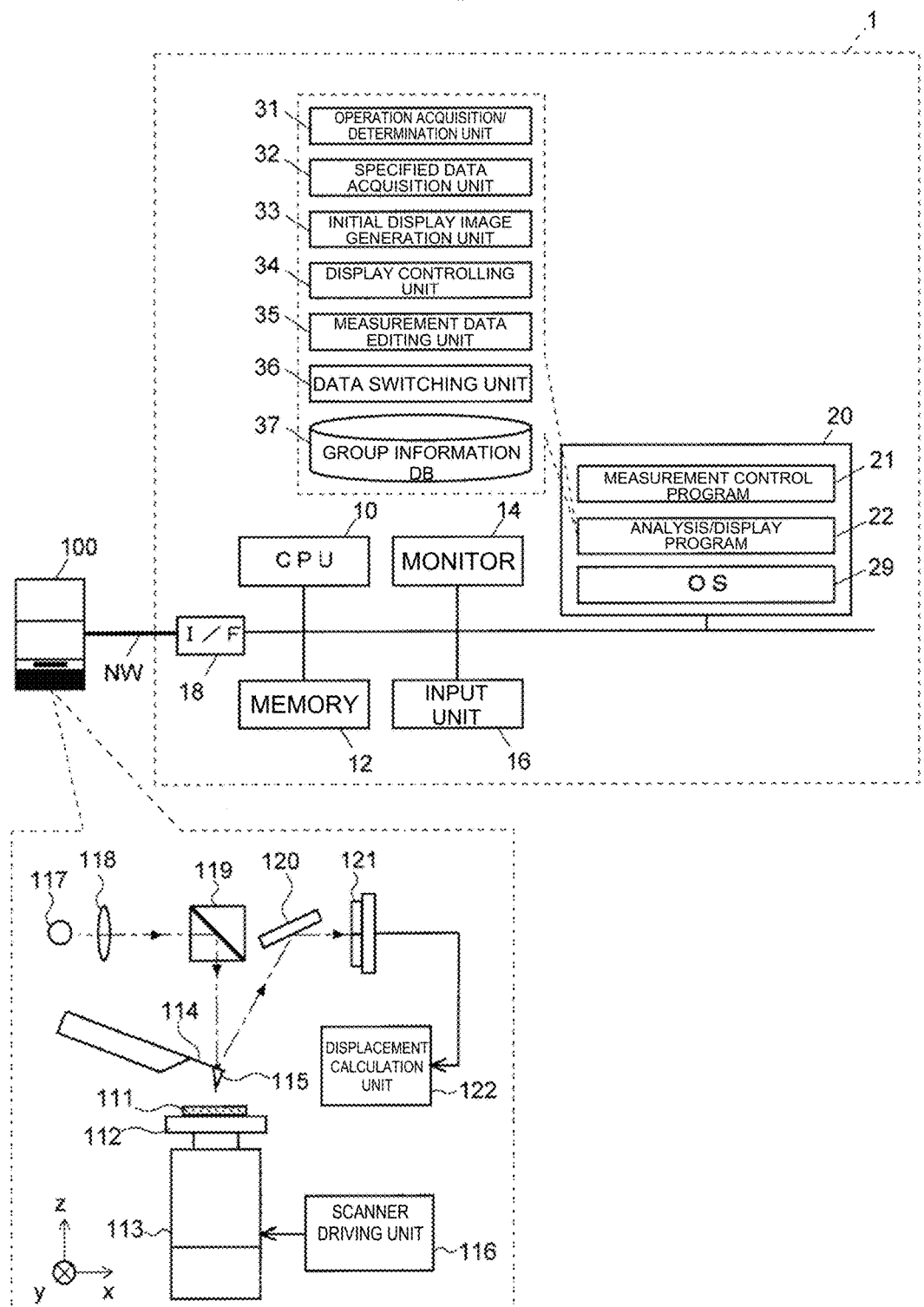
FIG. 1 is a schematic configuration diagram of a measurement system including a data display processing device for an SPM according to a first embodiment of the present invention.

FIG. 1 is a block diagram illustrating a schematic configuration of a measurement system including a data display processing device for an SPM according to a first embodiment of the present invention. The present measurement system includes an SPM 100, and a workstation 1 (corresponding to the data display processing device for the SPM of the present invention) that is connected to the SPM 100 and for managing measurement by the SPM 100, and analyzing and editing measurement results obtained by the SPM 100.

The SPM 100 measures the shape and various physical properties of a sample surface.

A sample 111 as an observation object is held on a sample stage 112 provided on a scanner 113 having an approximately cylindrical shape. A cantilever 114 having a probe 115 at the tip thereof is disposed above the sample 111, and an excitation unit (not shown) including a piezoelectric element vibrates the cantilever 114. The scanner 113 is a fine adjustment mechanism including a piezoelectric element, and finely moves the sample stage 112 in the respective directions of three axes ((x, y, z) orthogonal to each other in accordance with a voltage applied by a scanner driving unit 116. The voltage applied by the scanner driving unit 116 is controlled by a control signal that is transmitted from the workstation 1.

In order to detect a displacement in the z-axis (vertical) direction of the cantilever 114, a displacement detection mechanism that includes a laser beam source 117, a lens 118, a beam splitter 119, a mirror 120 and a photodetector 121 is provided above the cantilever 114. A laser beam (indicated by an alternate long and short dashed line in the drawing) emitted from the laser beam source 117 is focused by the lens 118, reflected by the beam splitter 119, and then arrives at the vicinity of the tip of the cantilever 114. The upper face (a face on the opposite side to a face on which the probe 115 is provided) of the cantilever 114 is coated with gold or aluminum, and the laser beam reflected at the upper face of the cantilever 114 is reflected by the mirror 120 and arrives at the photodetector 121 having a light-receiving surface divided into a plurality of light-receiving faces in the z-axis direction.

When performing normal observation in a DFM (Dynamic Force Microscope) mode, the cantilever 114 is vibrated in the z-axis direction at a frequency f in the vicinity of the resonance point thereof. At this time, if an attractive force (or repulsive force) produced by an interatomic force or the like acts between the probe 115 and the surface of the sample 111, the vibrational amplitude of the cantilever 114 changes. If the cantilever 114 is displaced up and down, the respective amounts of light incident on the plurality of light-receiving faces of the photodetector 121 change. A displacement calculation unit 122 calculates the displacement of the cantilever 114 by performing arithmetic processing on detection signals depending on the respective amounts of light received by the plurality of light-receiving faces, and sends a calculation result to the workstation 1.

Upon receiving feedback from the displacement calculation unit 122, the workstation 1 calculates a voltage value for moving the scanner 113 in the z-axis direction such that the displacement of the cantilever 114 becomes zero, that is, such that a distance between the probe 115 and the surface of the sample 111 keeps constant, and thereby controls the scanner driving unit 116 to finely move the scanner 113 in the z-axis direction. Further, the workstation 1 calculates voltage values for the x-axis and y-axis directions in order to relatively move the sample 111 with respect to the probe 115 in the xy-plane according to a predetermined scanning pattern, and finely moves the scanner 113 in the x-axis and y-axis directions through the scanner driving unit 116. The respective values of the control signals sent to the scanner driving unit 116 and the feedback signals received from the displacement calculation unit 122 are sequentially stored in the workstation 1. The workstation 1 refers to these signal values together with time series information, and creates measurement data set representing the height at each measurement position, that is, concavities and convexities on the surface of the sample 111 based on displacement in the z-axis direction of the cantilever 114 at respective coordinates in the xy-plane on the sample 111.

In addition to the concavities and convexities on the surface of the sample 111, the measurement system including the SPM 100 and the workstation 1 can measure various physical quantities. As one example, the measurement system can obtain the viscoelasticity or adsorbability at respective sites on the surface of the sample 111 based on a temporal shift between the phase of a control signal that is sent to the excitation unit to vibrate the cantilever 114 and the phase of a feedback signal from the displacement calculation unit 122. The measurement system can also obtain the electric potential at respective sites on the surface of the sample 111 by applying an alternating-current signal to the cantilever 114 and detecting an electrostatic force acting between the sample 111 surface and the cantilever 114. Other physical quantities may include deflection (vertical), deflection (lateral), amplitude, sinδ, cosδ and current, and the workstation 1 creates measurement data set based on the respective physical quantities. Further, the workstation 1 creates two kinds of measurement data set of trace and retrace for each of these physical quantities, for the respective scanning directions (outward path and return path) of the probe 115 with respect to the surface of the sample 111 and manages it as a single group.

The configuration of the workstation 1 will now be described in detail.

A substance of the workstation 1 is a computer, and a CPU 10 that is a central processing unit, a memory 12, a monitor 14 (corresponding to a display unit of the present invention) composed of an Liquid Crystal Display (LCD) or the like, an input unit 16 composed of a keyboard or mouse or the like, and a storage unit 20 are connected to each other. Among these components, the memory 12 is constituted by a volatile storage device such as a Random Access Memory (RAM), and the storage unit 20 is constituted by a nonvolatile storage device such as a Read Only Memory (ROM), a flash memory, an Erasable Programmable ROM (EPROM), an Electrically EPROM (EEPROM) (registered trademark), a Hard Disc Drive (HDD) or a Solid State Drive (SSD). A measurement control program 21 and an analysis and display program 22 are provided in the storage unit 20. Respective elements included in the analysis and display program 22 as described later are functional means realized by the CPU 10 which reads out and executes these programs in the memory 12. An Operating System (OS) 29 is also stored in the storage unit 20.

The workstation 1 includes an interface (I/F) 18 for controlling a direct connection to an external device or a connection through a network such as a Local Area Network (LAN) to an external device or the like. The workstation 1 is connected to the SPM 100 through a network cable NW (or a wireless LAN) by the I/F 18. A plurality of SPMs may be connected to the workstation 1.

The measurement control program 21 is application software for controlling measurement by the SPM 100. Specifically, among the aforementioned functions of the workstation 1, sending of control signals to the excitation unit and the scanner driving unit 116, acquisition of feedback signals from the displacement calculation unit 122, and storing of the respective values of these control signals and feedback signals in the storage unit 20 and the like are operations realized by execution of the measurement control program 21. The measurement control program 21 also executes a function of setting various parameters such as a physical quantity to be measured and a measurement target region based on an input operation by the user through the input unit 16.

The analysis and display program 22 is application software for analyzing a measurement result obtained by the SPM 100 based on various signal values stored by the measurement control program 21 in the storage unit 20, and displaying the analysis result as an image on the screen of the monitor 14.

As shown FIG. 1, an operation acquisition/determination unit 31, a specified data acquisition unit 32, an initial display image generation unit 33 (corresponding to a preliminary image generation means of the present invention), a display controlling unit 34, a measurement data editing unit 35, a data switching unit 36 (corresponding to a first display switching means of the present invention) and a group information database (DB) 37 (corresponding to a group information storage unit of the present invention) cooperate with the analysis and display program 22. The analysis and display program 22 need not necessarily be a separate program from the measurement control program 21, and these two programs may be provided as application software in which the two programs are packaged together.

The operation acquisition/determination unit 31 detects an input operation by a user through the input unit 16, and determines the contents of an instruction based on the input operation. For example, the operation acquisition/determination unit 31 refers to a click operation or a key input detected by the input unit 16 and information such as a GUI (Graphical User Interface) currently displayed on the screen of the monitor 14 to thereby identify the contents of the instruction, and notifies the specified data acquisition unit 32, the measurement data editing unit 35 or the data switching unit 36 or the like of a identified result.

The specified data acquisition unit 32 acquires measurement data set specified by the user from the group information DB 37 that is described later. Here, the term "specify" refers to manual selection of measurement data set to be displayed as an image on the screen of the monitor 14 such as clicking or inputting a file name. Hereunder, measurement data set specified by the user is referred to as "specified data set".

The initial display image generation unit 33 acquires all other measurement data seta belonging to a group in which the specified data set is included from the group information DB 37, and generates an initial display image for each of these measurement data sets. In the present embodiment, the term "initial display image" refers to an image in an initial form displayed on the screen of the monitor 14 when a certain measurement data set is selected as a display object in a normal mode, and typically is a top view image of 512×512 pixels. This display format is preferable because the format is used for an original image of thumbnails in many general analytical software applications.

Figure 3:
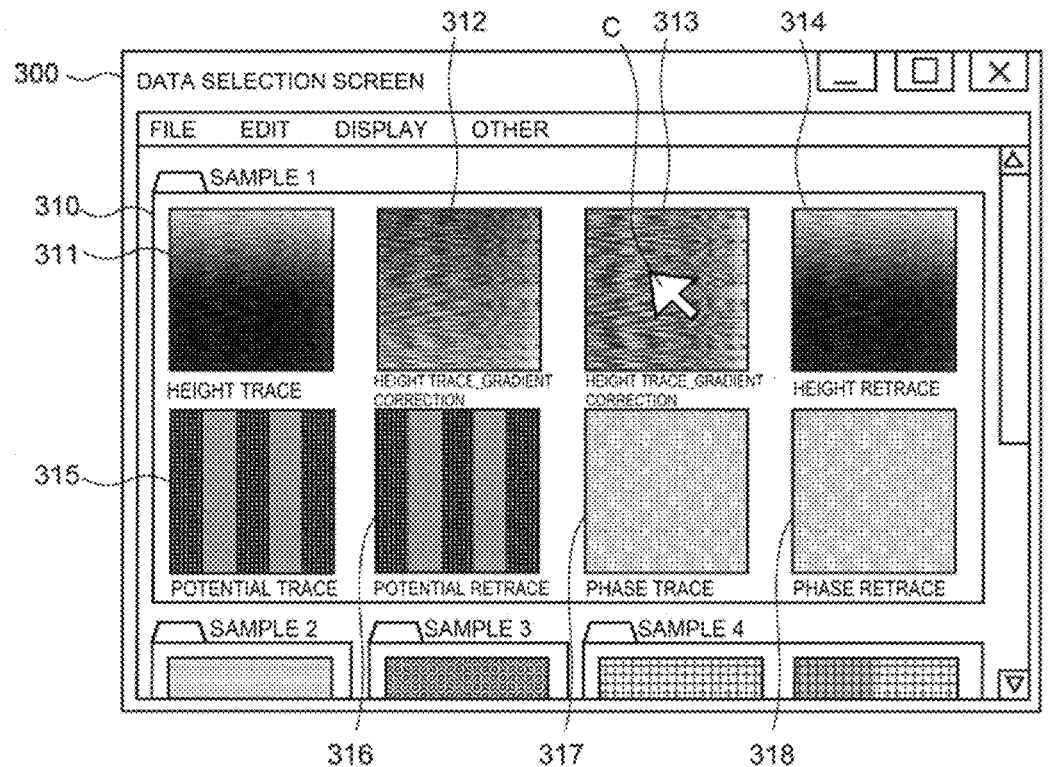
FIG. 3 illustrates an example of a measurement data selection screen displayed by the data display processing device for the SPM according to the first embodiment.
Figure 4:
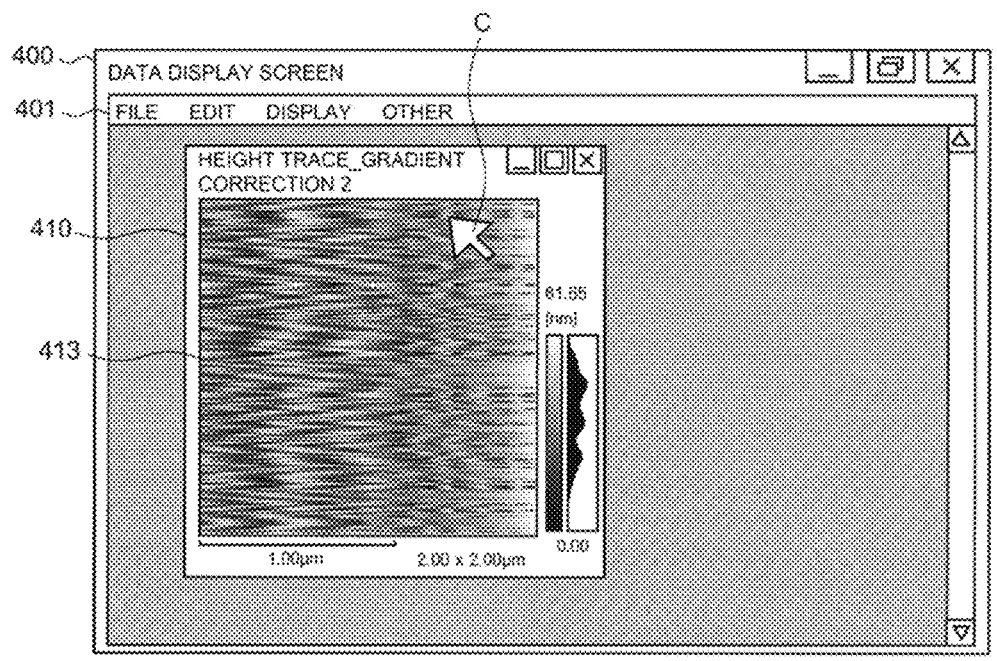
FIG. 4 illustrates an example of a specified data display screen displayed by the data display processing device for an SPM according to the first embodiment.

The display controlling unit 34 sends video signals for various information processed by the analysis/display program 22 to the monitor 14. In the present embodiment, the display controlling unit 34 displays thumbnails 311 to 318 of eight measurement data sets in a group 310 on a data selection screen 300 as shown in FIG. 3, or a specified data image 413 acquired by the specified data acquisition unit 32 on a data display screen 400 as shown in FIG. 4.

The measurement data editing unit 35 executes editing processing on a measurement data set in response to an instruction by the user. For example, the measurement data editing unit 35 corrects specified data set displayed as an image on the screen of the monitor 14, extracts a line having a concavo-convex shape on a line segment that links a predetermined two points, or generates an image that combines a plurality of display formats.

The data switching unit 36 switches an image of a measurement data set displayed on the screen of the monitor 14. Specifically, the data switching unit 36 sends an instruction signal to the display controlling unit 34 so as to cause an initial display image generated by the initial display image generation unit 33 to be displayed in a display region for a specified data image which is described later in response to a switching operation (corresponding to a first predetermined input operation of the present invention) by the user.

The group information DB 37 stores information for a plurality of measurement data sets per group. Information indicating a creation date and time, a corresponding file name, and the kinds and number of editing processes executed and the like is associated with each of the measurement data set. Addition, deletion or changes or the like for the measurement data sets is performed for each group in accordance with an instruction by the user.

<Flow of Data Switching Processing>

The flow of data switching processing performed by the analysis/display program 22 of the present embodiment will now be described with reference to FIG. 2 that is a flowchart and, as necessary, to FIG. 3 to FIG. 6.

First, the operation acquisition/determination unit 31 determines whether or not the user specifies a measurement data set (step S101). Specifically, the operation acquisition/determination unit 31 determines whether or not a double-click operation is detected on a display region of thumbnails (for example, 311 to 318) of a plurality of measurement data sets displayed on the data selection screen 300 shown in FIG. 3.

Here, it is assumed that the user moves a cursor C over a thumbnail 313 of a measurement data set "height trace_gradient correction 2" belonging to the group 310 of "sample 1" and performs a double-click operation. In response to the operation, the operation acquisition/determination unit 31 determines that the measurement data set is specified ("Yes" in step S101), and notifies the determination result to the specified data acquisition unit 32 and the initial display image generation unit 33.

The specified data acquisition unit 32 then acquires a specified data set (step S102). Specifically, based on the determination result notified from the operation acquisition/determination unit 31, the specified data acquisition unit 32 queries the group information DB 37 with regard to the measurement data set "height trace_gradient correction 2" to retrieve it as the specified data set.

In addition, the initial display image generation unit 33 acquires all other measurement data sets belonging to the same group 310 as the specified data set (step S103). Specifically, based on the determination result notified from the operation acquisition/determination unit 31, the initial display image generation unit 33 queries the group information DB 37 with regard to the measurement data set "height trace_gradient correction 2" as the specified data set, and acquires all of the seven measurement data sets other than the specified data set. The initial display image generation unit 33 then generates an initial display image as described above for each of the seven measurement data sets (step S104).

The steps S102 and S103 may be executed simultaneously. As another example, in step S101, the operation acquisition/determination unit 31 may notify only the specified data acquisition unit 32 of the determination results. In this case, the specified data acquisition unit 32 notifies an identifier of the measurement data set corresponding to the specified data set to the initial display image generation unit 33 after acquiring the specified data set.

Next, the display controlling unit 34 displays the specified data set in a window on the screen (step S105). Specifically, the display controlling unit 34 newly creates a window 410 on the data display screen 400 as shown in FIG. 4, and displays the specified data image 413 corresponding to the measurement data set "height trace_gradient correction 2" in the window 410. If the data display screen 400 has not been displayed on the screen of the monitor 14 in a stage prior to the step 105, the data display screen 400 also displays the data display screen 400 in this step.

Next, the operation acquisition/determination unit 31 determines whether or not an editing operation is performed with respect to the specified data set (step S106). Specifically, if various kinds of data editing processes can be selected from an "Edit" menu on a menu bar 401 on the data display screen 400, the operation acquisition/determination unit 31 determines whether or not an operation such as a click is detected in a display region of a GUI assigned to the editing processing in question.

When the editing operation is detected ("Yes" in step S106), the operation acquisition/determination unit 31 notifies the contents of the editing operation to the measurement data editing unit 35, and the measurement data editing unit 35 performs editing processing in accordance with the contents on the specified data set (step S107).

The specified data image 413 shown in FIG. 4 is an image obtained after performing a gradient correction in the z-axis direction twice with respect to a measurement data set "height trace" (corresponding to the thumbnail 311 in FIG. 3) that is included in the group 310 of the same "sample 1". Specifically, before the specified data image 413 is obtained, a series of editing and storing processes are performed that take the data "height trace" that is the original data as the specified data set.

Thereafter, When the operation acquisition/determination unit 31 detects a storage instruction operation by the user ("Yes" in step S108), upon receiving the input of data from the measurement data editing unit 35, the specified data set after the editing processing in step S107 is added to the group 310 of "sample 1" (step S109) in the group information DB 37.

On the other hand, when a storage instruction is not input ("No" in step S108), the processing returns to step S106.

In step S106, when the editing operation is not detected ("No" in step S106), next, the operation acquisition/determination unit 31 determines whether or not an operation for transitioning to the data switching mode is performed (step S110). Specific examples of the operation for transitioning to the data switching mode include a double-click operation within the display region of the specified data image 413, depressing multiple keys in a state in which the window 410 is in the foreground on the screen, and a combination of depression of a predetermined key and a click operation within the display region. Preferably, the operation for transitioning to the data switching mode is preset at the time of development of the program, and the user may change the operation. When the operation for transitioning to the data switching mode is not detected ("No" in step S110), the processing returns to step S106.

On the other hand, when the operation for transitioning to the data switching mode is detected ("Yes" in step S110), the analysis/display program 22 transitions to the data switching mode (step S111).

Figure 5A:
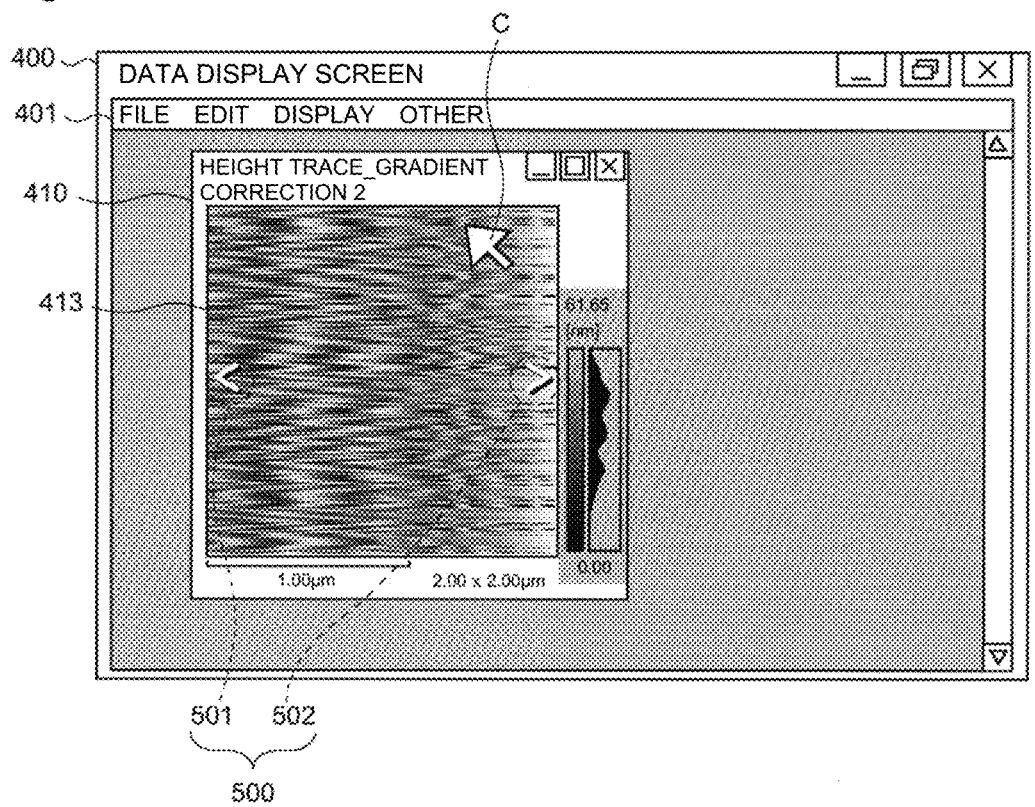
FIG. 5A, FIG. 5B and FIG. 5C illustrate examples of screen displays in a data switching mode displayed by the data display processing device for the SPM according to the first embodiment.

An example of the screen displayed on the monitor 14 at such time is shown in FIG. 5A. In comparison to FIG. 4, switching marks 500 are displayed in the vicinity of the left and right edges of the specified data image 413. The switching marks 500 consist of a previous mark 501 and a next mark 502. As other examples, the display positions of the switching marks 500 may be in the vicinity of the upper and lower edges of the specified data image 413, or may be on the outside of the specified data image 413.

To ensure that the user realizes that the current mode is the data switching mode, and is not information regarding an image after switching which is described later, it is preferable to decrease the pixel values in a region showing information unique to the specified data set (for example, a histogram on the right lower side of the window 410) to thereby make the user hard to see such information.

First, the operation acquisition/determination unit 31 determines whether or not an end operation to the data switching mode is performed (step S112). The end may be the same operation as the operation for transitioning to the data switching mode or may be a different operation. However, the end operation needs to be distinguishable from a switching operation or confirmation operation which is described later for avoiding confusion. The user may also arbitrarily change the end operation. When the end operation is detected ("Yes" in step S112), the analysis/display program 22 ends the data switching mode (step S117), and returns to step S106.

When the end operation is not detected ("No" in step S112), the operation acquisition/determination unit 31 then determines whether or not a switching operation is performed (step S113). Specifically, in the example illustrated in FIG. 5A, the operation acquisition/determination unit 31 determines whether or not a click operation on the display region (and vicinity thereof) of either of the previous mark 501 and the next mark 502 is detected. As other examples, the switching operation may be depression of either of a left, right, upward and downward direction keys, or may be rotation of the wheel of a mouse. When this kind of switching operation is not detected ("No" in step S113), the processing returns to step S112.

Figure 5B:
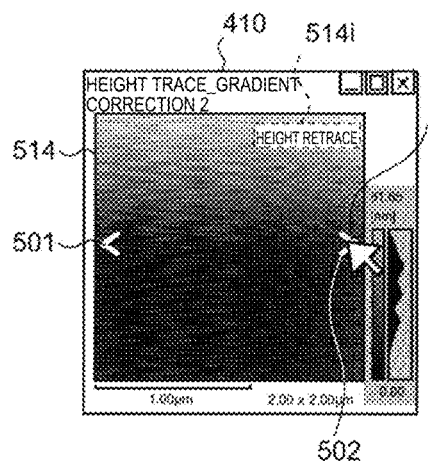
Figure 5C:
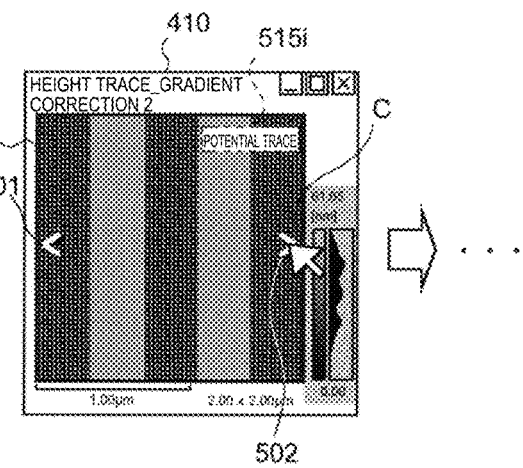

When the switching operation is detected ("Yes" in step S113), the data switching unit 36 switches to display an image of a measurement data set in the window 410 (step S114). Here, the term "image of a measurement data set" refers to the initial display image generated in step S104 other than the specified data set. Accordingly, for example, When the click operation on the next mark 502 is detected in the state illustrated in FIG. 5A, the data switching unit 36 instructs the display controlling unit 34 to switch the specified data image 413 so as to display an initial display image 514 for a measurement data set "height retrace" (corresponding to a thumbnail 314 in FIG. 3) subsequent to the measurement data set "height trace_gradient correction 2" in the group 310. An example of a screen display obtained as a result of this switch is illustrated in FIG. 5B (for simplification, only the window 410 is illustrated). In this state, when a further click operation on the next mark 502 is detected, the displayed image is switched from the initial display image 514 to an initial display image 515 for the next measurement data set "potential trace" (corresponding to a thumbnail 315 in FIG. 3) (FIG. 5C). Similarly, when a click operation on the previous mark 501 is detected in the state illustrated in FIG. 5A, the displayed image is switched from the specified data image 413 to an initial display image for a measurement data set "height trace_gradient correction 1" (corresponding to a thumbnail 312 in FIG. 3) before the measurement data set "height trace_gradient correction 2" in the group 310 (illustration is omitted from the drawings).

In a case where the first or last measurement data set in the group 310 is reached as a result of repeatedly switching the displayed image in one direction, the previous mark 501 or next mark 502 of the switching marks 500 may be hidden to thereby disable switching, or enables switching to the last or first measurement data set in the group 310 by looping.

In order to notify the user of the relationship between the switched and displayed initial display image and the measurement data set, as shown in FIGS. 5B and 5C, it is preferable to attach additional information 514$i$ and 515$i$ (corresponding to information pertaining to each measurement data set of the present invention) that indicates the kind of measurement data set and the like to the initial display image 514 and 515, respectively and display the additional information. Such information may be created based on the measurement data acquired from the group information DB 37 in step S103. Examples of the additional information 514$i$ and 515$i$ include, in addition to the kind of the measurement data set and a scanning direction, the date and time of the measurement data creation, the corresponding file name, and the total number of measurement data sets in the group 310, and which number the relevant measurement data set is among the total number of measurement data sets. In addition, the kinds and number of editing processes (that is, the editing history) performed until creating the relevant measurement data set or the like may also be attached. The editing history can be identification information for, in a case where, for example, a plurality of edited measurement data sets created from the same original data exist, identifying a measurement data set (and a method of creating the relevant measurement data set) that is preferable in the light of low noise or high visibility when the user switches to display the edited measurement data sets so as to compare them. Although in FIGS. 5B and 5C the additional information 514$i$ and 515$i$ are displayed so as to be superimposed on the initial display image 514 and 515, respectively, a display form is not limited thereto, and for example the additional information 514$i$ and 515$i$ may be displayed in a blank region of the window 410 or may be embedded as an image in the initial display images 514 and 515.

Next, the operation acquisition/determination unit 31 determines whether or not a confirmation operation is performed (step S115). Here, the term "confirmation" refers to, with respect to an initial display image displayed for simple viewing of a measurement data set specifying the measurement data set corresponding to the initial display image as new specified data set. Examples of the confirmation operation include a click operation in a region other than the regions of each switching mark and the vicinities thereof within the display region of the initial display image or depression of an Enter key or the like. When the confirmation operation is not detected ("No" in step S115), the processing returns to step S112.

When the confirmation operation is detected ("Yes" in step S115), the display controlling unit 34 displays the confirmed measurement data set in a new window on the screen of the monitor 14 (step S116). Specifically, the specified data acquisition unit 32 executes the processing in steps S102 and S105 on a measurement data set corresponding to the initial display image displayed in the window 410 at the time point when "Yes" is determined in step S115. In a case where a measurement data set in the same group 310 is newly specified, steps S103 and S104 can be omitted. The image displayed in the preceding step S105 may be used as the initial display image of the previous specified data. The processing relating to the window 410 then returns to step S112.

Figure 6A:
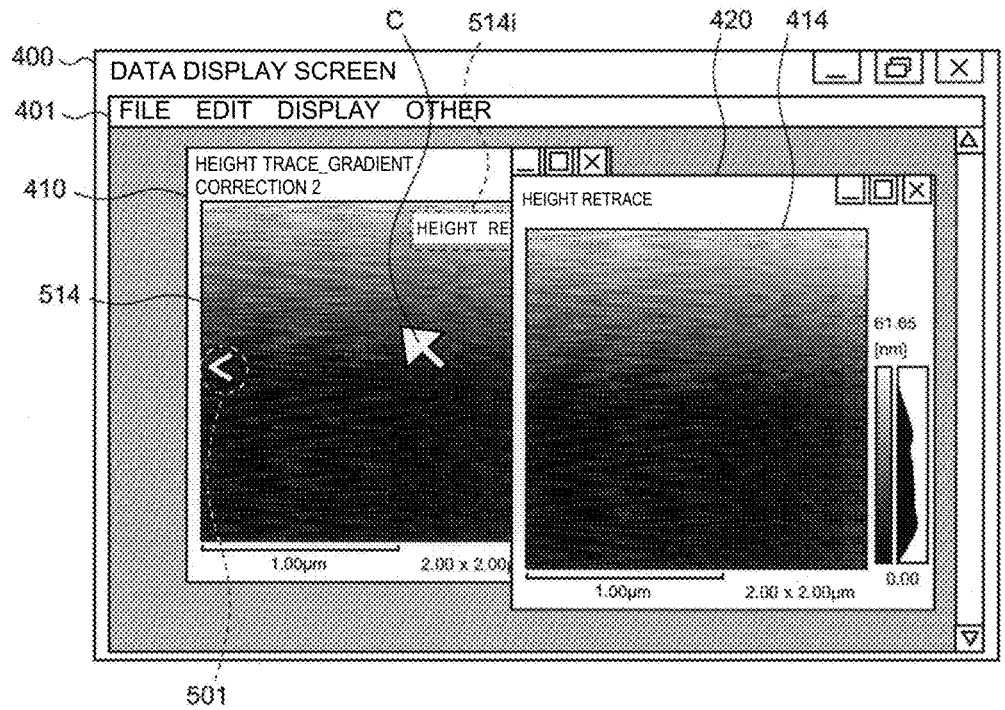
Figure 6B:
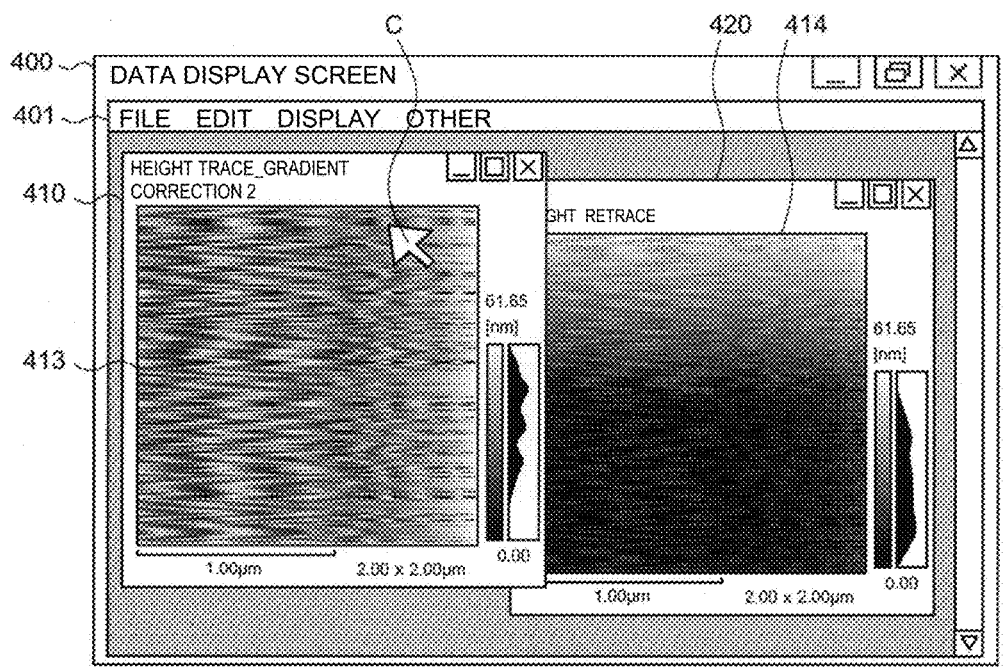

An example of the screen display on the monitor 14 at this time is shown in FIG. 6A. It is assumed here that the user performs a confirmation operation while the initial display image 514 shown in FIG. 5B is displayed. As a result, the measurement data set "height retrace" is determined as new specified data set, and a specified data image 414 for the measurement data set is displayed in a new window 420. In this case where the user wants to compare the specified data image 414 and the specified data image 413 for "height trace_gradient correction 2" that is previously specified, the user may select the window 410 and perform the end operation. An example of the screen display obtained as a result is shown in FIG. 6B. As a different example, the user may perform the confirmation operation in step S115 to end the data switching mode in the window 410 instead of the end operation in step S112.

The measurement data set confirmed in step S115 as described above becomes the new specified data set, and a new window that displays an image for the new specified data set is also an object for steps S106 to S117. In other words, display of an image of a measurement data set can also be switched in the window 420 illustrated in FIG. 6.

Figure 2:
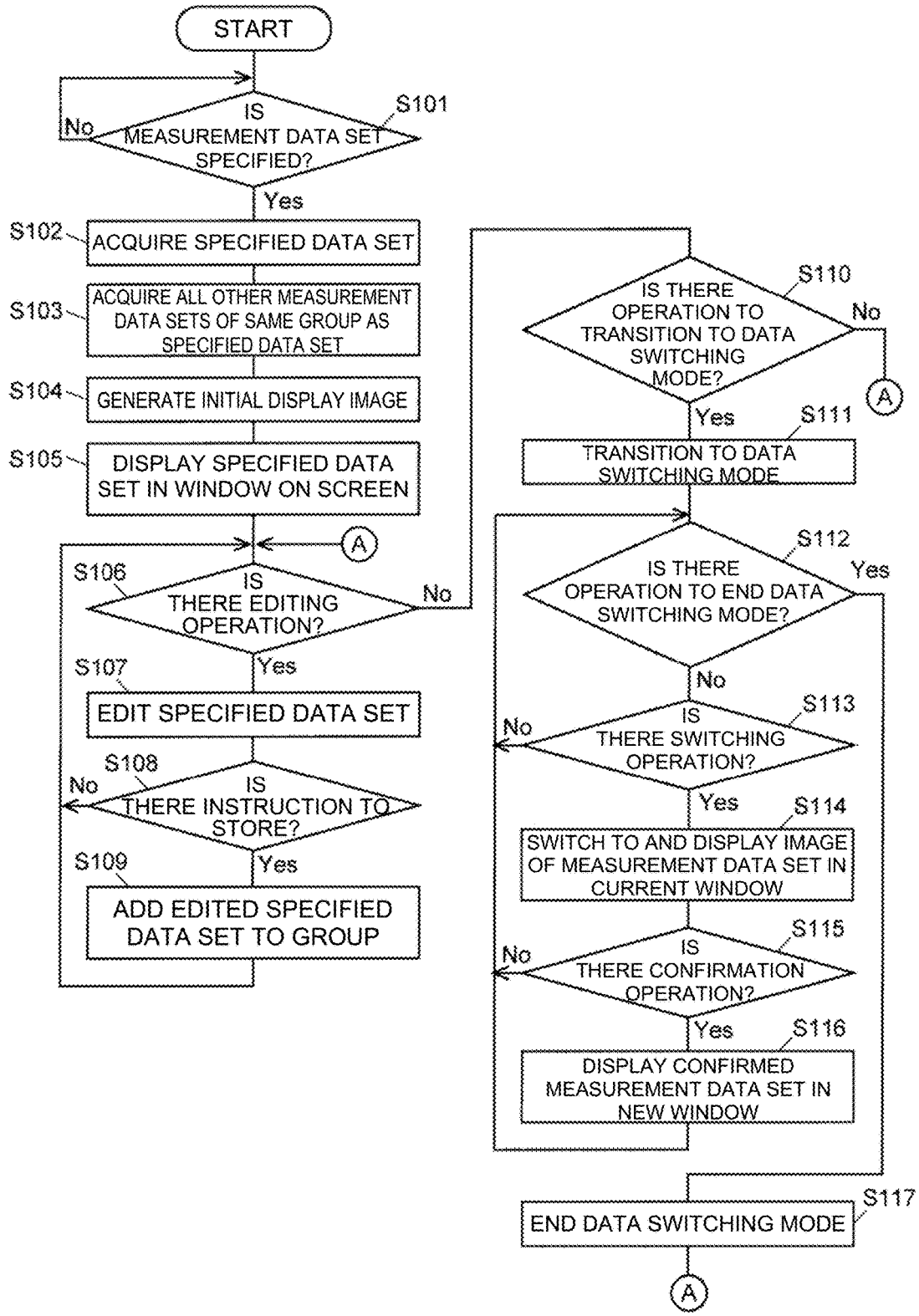
FIG. 2 is a flowchart illustrating an example of the flow of data switching processing executed by the data display processing device for an SPM according to the first embodiment.

Further, the order of performing the steps S106 to S109 and the steps S110 to S117 in FIG. 2 may be reversed.

According to the above described processing, when a user specifies a desired measurement data set as a display object, all measurement data sets belonging to the group 310 in which the specified measurement data set (specified data set) is included are acquired from the group information DB 37. With respect to the specified data set, the specified data image 413 is displayed in the window 410 within the data display screen 400. With respect to each of the measurement data sets other than the specified data set, an initial display image is generated which is an image to be initially displayed in a case where any measurement data set is selected as a display object (that is, becomes the specified data set). Then, the window 410 transitions to the data switching mode when the user performs a predetermined transition operation while the specified data image 413 is displayed, and by performing a simple operation such as clicking on the switching marks 500 displayed within (or in the vicinity of) the display region of the specified data image 413, display of the specified data image 413 and the seven initial display images can be switched in the window 410. In other words, zapping (switching and viewing) between all of the measurement data sets in the group 310 is enabled, and each measurement data set can be visually checked with ease. Further, the simple switching operation with supressed gazing point as described above can significantly reduce the troublesomeness in viewing a plurality of measurement data sets.

In addition, in a case where a desired measurement data set is found during zapping, by performing a predetermined confirmation operation while an initial display image of the measurement data set is displayed, the measurement data set is displayed in the separate window 420 as new specified data set. By this means, it is easy to display and compare different measurement data sets in the two different windows 410 and 420, and thus the convenience for the user is enhanced.

Further, since all measurement data sets belonging to the same group 310 as the specified data set can be viewed in the present embodiment, the risk of overlooking a measurement data set due to non-recognition by the user can be reduced.

[Second Embodiment]

In the above described first embodiment, a configuration is described in which one initial display image is generated for each measurement data set, and display of the initial display images are switched. In the present embodiment, a configuration is described that additionally enables zapping in a simple manner of images of specified data set in a plurality of display formats.

Normally, in analytical software for an SPM, one measurement data set can deal with a plurality of display formats. For example, the available types of display formats include top view, height (2D), line (2D), mesh (2D), contour line, shaded, mixed, height (3D), line (3D) and mesh (3D), and in some cases the available display formats differ depending on the kind of measurement data set. Conventionally, when a user wants to change the display format of a measurement data set during display, for example, it is necessary for the user to set the display format from a "Display" menu on the menu bar 401 on the data display screen 400 shown in FIG. 4. However, if the set display format is not the desired display format, it is necessary for the user to set the display format once more. In a case where the intended display format is unclear for the user, the operation to search for the intended display format is troublesome. The present embodiment solves this problem by means of the zapping operation.

Figure 7:
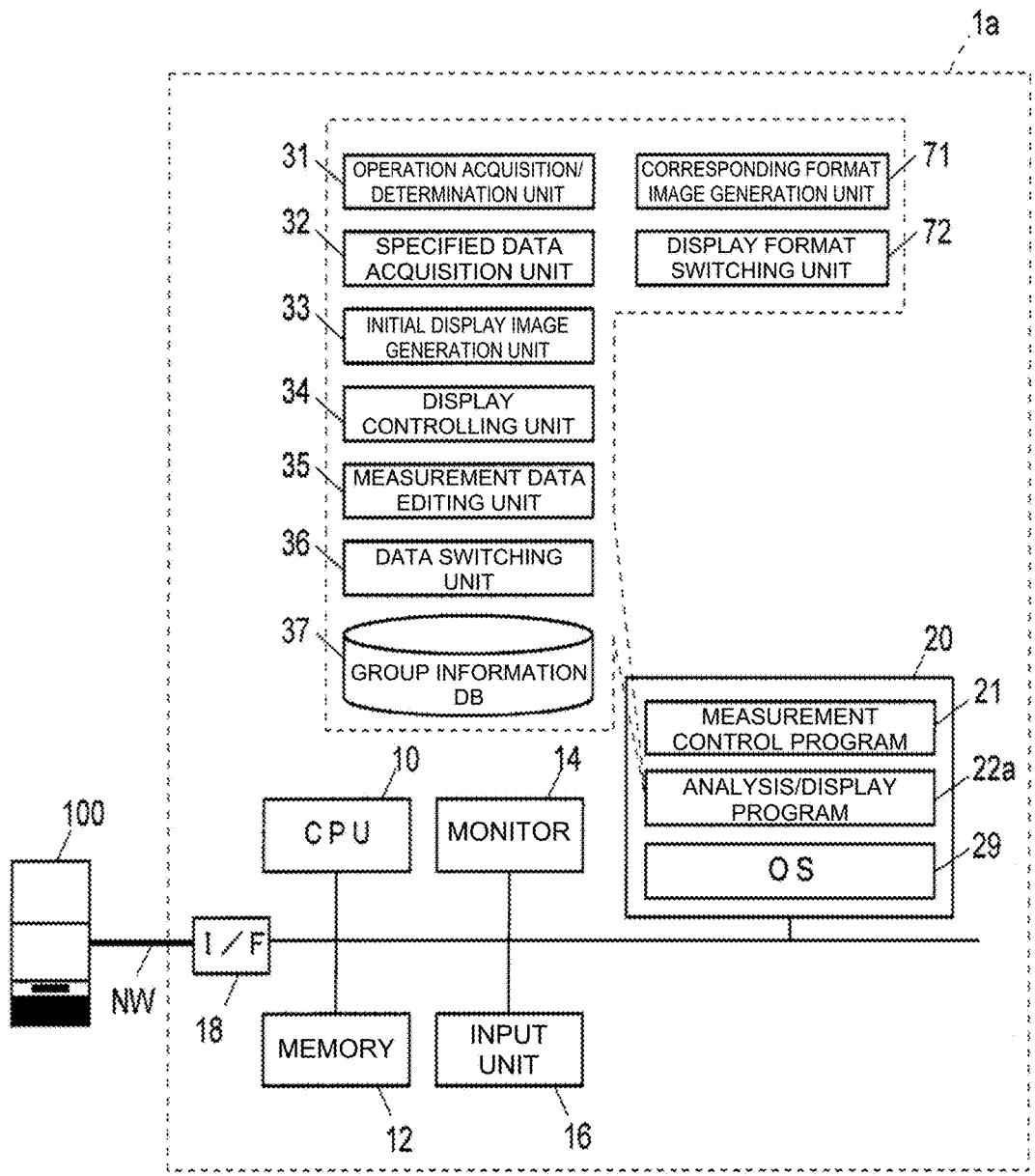
FIG. 7 is a schematic configuration diagram of a measurement system including a data display processing device for an SPM according to a second embodiment of the present invention.

FIG. 7 is a block diagram illustrating the schematic configuration of a measurement system including a data display processing device for an SPM according to a second embodiment of the present invention. The present measurement system includes the SPM 100 and a workstation 1a. The internal configuration of the SPM 100 is the same as that in the above described first embodiment, and is therefore not shown in FIG. 7.

The configuration of the workstation 1a is the same as the configuration of the workstation 1 according to the first embodiment, except that the workstation 1a includes an analysis/display program 22a instead of the analysis/display program 22. The analysis/display program 22a includes, in addition to the respective elements of the analysis/display program 22, a corresponding format image generation unit 71 (corresponding to the format-based preliminary image generation means of the present invention) and a display format switching unit 72 (corresponding to the second display switching means of the present invention). Further, the group information DB 37 in the present embodiment corresponds to the display format storage unit of the present invention.

The corresponding format image generation unit 71 identifies all other display formats to which the specified data set corresponds based on information for the specified data set acquired by the specified data acquisition unit 32, and generates a format-based initial display image for each of the identified display formats which is an image of an initial form for use when the corresponding display format is displayed on the screen of the monitor 14. Here, the term "initial form" refers to specifically, for example, with regard to various parameters such as color and luminance, and an overhead view and a rotation angle with respect to 3D, a form in which the values to be initially applied in a case where the respective display formats are selected are reflected. The term "other display format" refers to, among all the display formats to which the specified data set can correspond, the display formats excluding the display format that is currently displayed on the screen (or display of the format is instructed).

The display format switching unit 72 switches the display format of the specified data set displayed on the screen of the monitor 14. Specifically, the display format switching unit 72 sends an instruction signal to the display controlling unit 34 so as to display a format-based initial display image generated by the corresponding format image generation unit 71 in the display region for the specified data image as illustrated in the above described first embodiment in accordance with a switching operation (corresponding to the second predetermined input operation of the present invention) by the user.

<Flow of Display Format Switching Processing>

The flow of display format switching processing executed by the analysis/display program 22a of the present embodiment will now be described with reference to FIG. 8 that is a flowchart and, as necessary, FIG. 9. In the present embodiment, the display format switching mode starts upon a predetermined transition operation after a specified data image is displayed, similarly to the data switching mode in the first embodiment described above. The operation for transitioning to the display format switching mode differs from the operation for transitioning to the data switching mode in the first embodiment or an end operation of the data switching mode.

Figure 8:
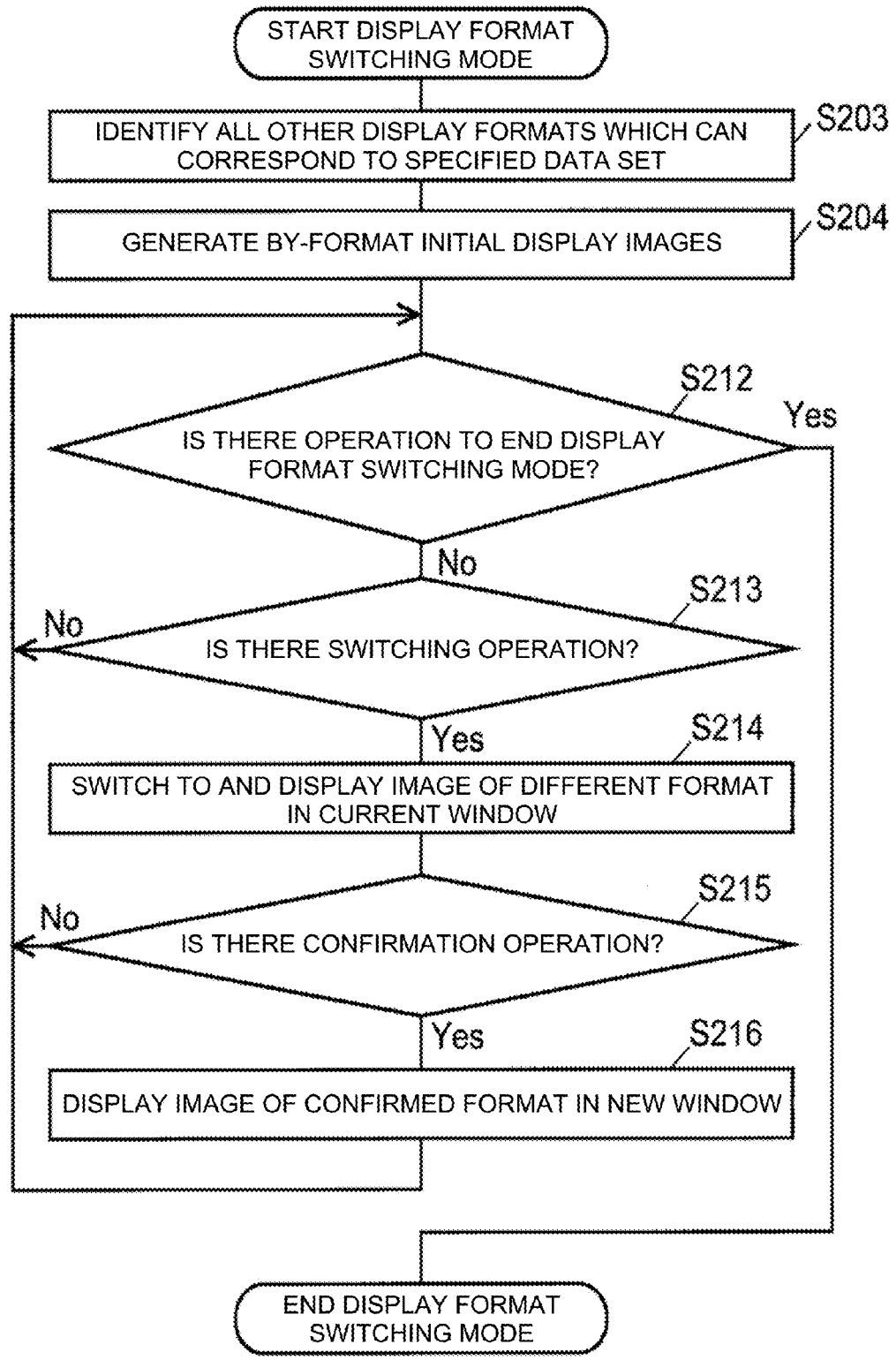
FIG. 8 is a flowchart illustrating an example of the flow of display format switching processing by the data display processing device for the SPM according to the second embodiment executes.

To simplify the description, only processing characteristic to the present embodiment is shown in FIG. 8. In the present embodiment, it is also assumed that the measurement data set "height trace_gradient correction 2" is selected as specified data set from the same group 310 as in the first embodiment (see FIG. 3), and at least steps S101 to S105 (see FIG. 2) are executed. The steps subsequent to step S106 may be executed before or after the display format switching mode starts.

Figure 9:
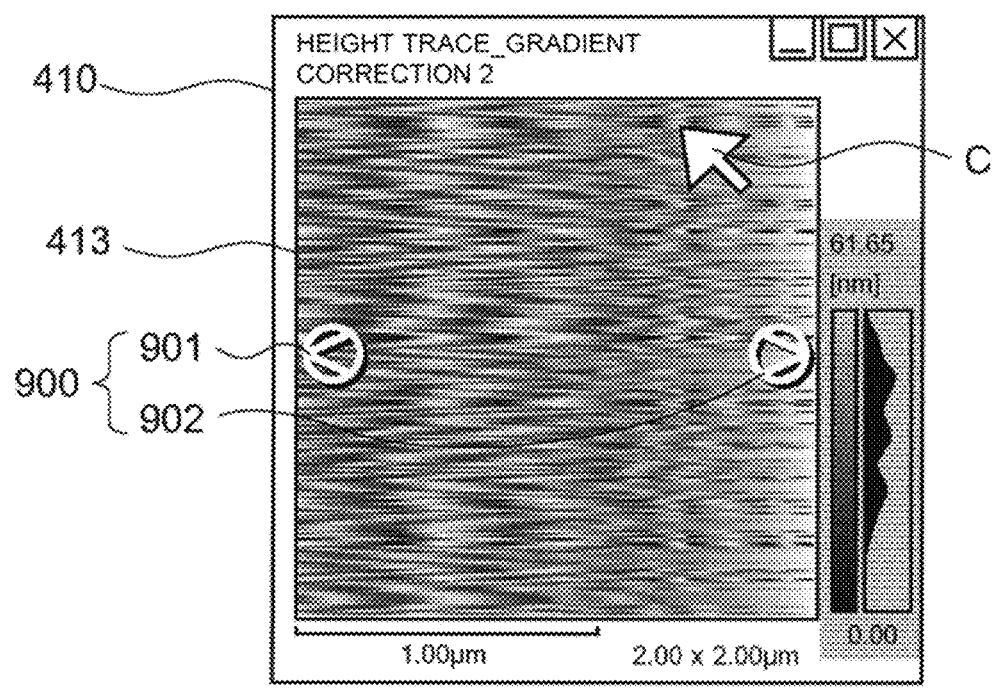
FIG. 9 illustrates an example of a screen display in a display format switching mode displayed by the data display processing device for the SPM according to the first embodiment.
Figure 10A:
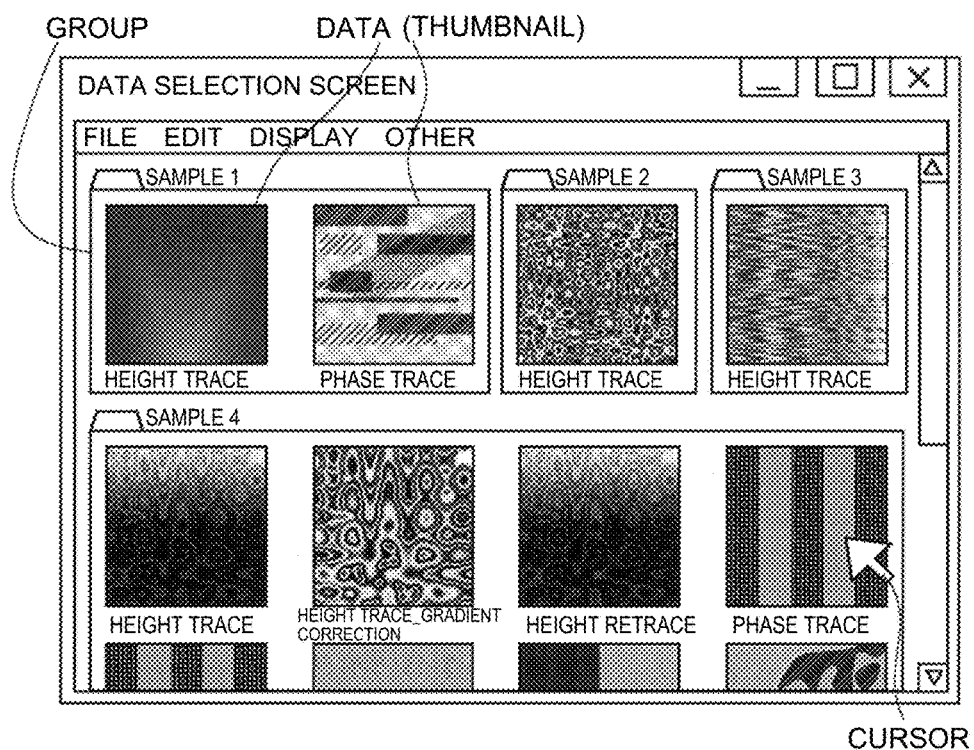
Figure 10B:
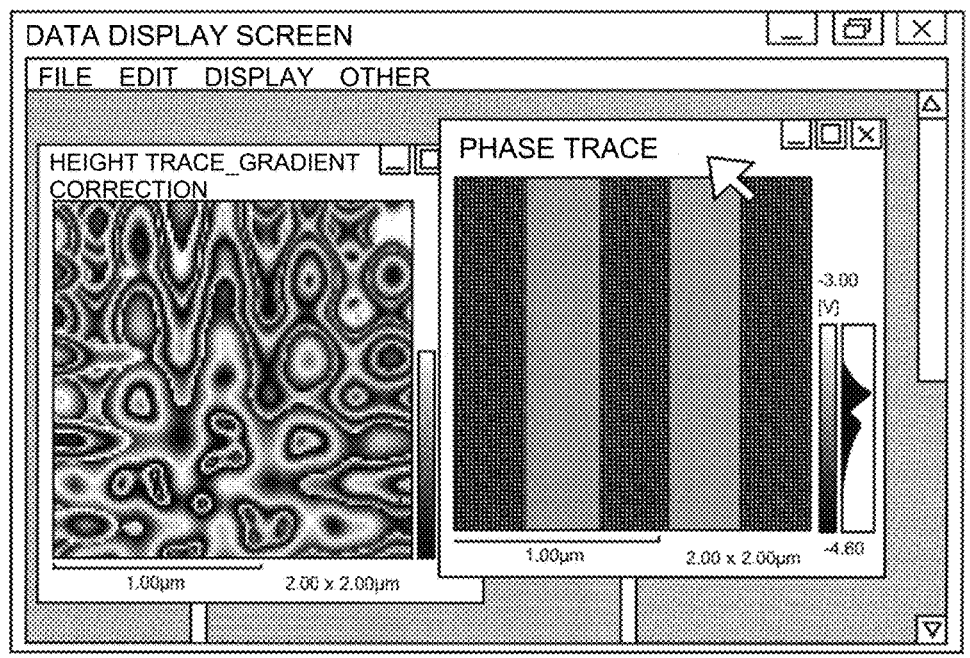

An example of a screen displayed on the monitor 14 in the display format switching mode is shown in FIG. 9 (only the contents within the window 410 are illustrated). In the present mode, it is preferable to display switching marks 900 (a previous mark 901 and a next mark 902) different from the switching marks 500 in the data switching mode shown in FIG. 5A. The display positions of the switching marks 900 are the same as the switching marks 500.

First, the corresponding format image generation unit 71 identifies all of the other display formats to which the specified data set can correspond (step S203). Specifically, the corresponding format image generation unit 71 queries the group information DB 37 with regard to the specified data set "height trace_gradient correction 2" acquired in step S102 shown in FIG. 2, and identifies display formats other than the format is currently displayed and are associated with the specified data set. The corresponding format image generation unit 71 generates a format-based initial display image as described above for each of the identified display formats (step S204).

Next, the operation acquisition/determination unit 31 determines whether or not an operation is performed to end the display format switching mode (step S212). The end operation may be the same operation as the operation to end the data switching mode, and preferably the user can arbitrarily change the operation. However, similarly to the first embodiment, the operation needs to be distinguishable from a switching operation or a confirmation operation described later for avoiding confusion. When the end operation is detected ("Yes" in step S212), the analysis/display program 22 ends the display format switching mode.

When the end operation is not detected ("No" in step S212), next, the operation acquisition/determination unit 31 determines whether or not a switching operation is performed (step S213). The processing in this step is the same as in step S113 in the foregoing first embodiment, and the switching operation may also be the same as that in the first embodiment. When the switching operation is not detected ("No" in step S213), the processing returns to step S212.

When the switching operation is detected ("Yes" in step S213), the display format switching unit 72 switches to display an image of a different format in the window 410 (step S214). Here, the term "image of a different format" refers to a format-based initial display image generated in step S204 with respect to a format other than the top view format shown in FIG. 9. Accordingly, for example, when a click operation is detected on the next mark 902 in the state shown in FIG. 9, the display format switching unit 72 instructs the display controlling unit 34 to switch the specified data image 413 (top view format) so as to display an image (not illustrated in the drawings) in the initial form of a display format "height 2D" that is the next format after "top view" in the group 310. The form of the switching and displaying is the same as in the above described first embodiment, and a format-based initial display image of the specified data set is displayed by switching the initial display image of the measurement data set.

Next, the operation acquisition/determination unit 31 determines whether or not a confirmation operation is performed (step S215). The processing in this step is the same as in step S115 in the first embodiment, and the confirmation operation may also be identical to the confirmation operation in the first embodiment. When no confirmation operation is detected ("No" in step S215), the processing returns to step S212.

When the confirmation operation is detected ("Yes" in step S215), the display controlling unit 34 displays the specified data image in the confirmed display format in a new window on the screen of the monitor 14 (step S216). Specifically, the display controlling unit 34 displays the specified data image in a display format corresponding to the format-based initial display image displayed in the window 410 at the time point when "Yes" is determined in step S215. The processing relating to the window 410 then returns to step S212.

If the user wishes to compare the confirmed display format with the top view image, similarly to the above described first embodiment, the user may perform the above described end operation in the window 410. Further, if an operation for transitioning to the display format switching mode is performed in the new window, steps S212 to S216 are executed in the new window. The image displayed in step S105 in FIG. 2 can be utilized as a format-based initial display image for a top view.

In the present embodiment, the timing at which steps S203 and S204 are executed need not be limited to after the start of the display format switching mode as shown in FIG. 8. For example, steps S203 and S204 may be executed between steps S102 and S105 shown in FIG. 2.

According to the above described processing, in addition to the first embodiment, when the user performs a predetermined operation for transitioning to the display format switching mode while the specified data image 413 is displayed, all other display formats to which the specified data set can correspond are identified, and a format-based initial display image is generated for each of the other display formats. The format-based initial display image has a similar concept to that of the initial display image in the first embodiment, that is, the format-based initial display image is an image initially displayed in a case where the display format thereof is selected. By performing a simple switching operation similar to the first embodiment, the user can zap various display formats used when displaying the specified data set as an image.

Further, by displaying the confirmed display format in a separate window, it is easy to make a comparison between a plurality of display formats. In addition, by enabling zapping between all the corresponding display formats, for example, even a user unfamiliar with the operations of analytical software can easily identify by visual observation of a display format that most matches the purpose of the user, thereby contributing to improving the usability.

[Modifications]

The present invention is not limited to the respective embodiments described above, and appropriate changes made within the spirit of the present invention are allowed. Hereunder, a part of the modifications of the present invention are described.

Although in the respective embodiments described above, the input unit 16 is described as a mouse or a keyboard, the input unit 16 may be a touch panel. In a case where the input unit 16 is implemented as a touch panel, a multi-touch operation (for example, touching three points or more) on the specified data image 413 may be adopted as a trigger for transitioning to the data switching mode or the display format switching mode.

Further, in the respective embodiments described above configurations are described in which, after a confirmation operation is performed in the data switching mode or display format switching mode, the measurement data set or display format that was confirmed is displayed in a new window. As a different example, a configuration can also be adopted in which a new window is displayed at the time of transitioning to the data switching mode or display format switching mode, display of other measurement data sets are switched in the new window, and when a confirmation operation is performed, the specified data image of the confirmed measurement data set is displayed in the new window. As another different example, switching display and display of a new specified data image may be performed without dividing the windows, that is, with only the window 410. In a case where the purpose of switching display is to search for a measurement data set and a comparison is not necessary, space can be saved in the display region by applying the present configuration.

In the above described first embodiment, as a result of, by the initial display image generation unit 33, acquiring all of the other measurement data sets belonging to the group 310 in step S103, zapping of all of the measurement data sets in the group 310 is enabled. However, acquiring all of the other measurement data sets belonging to the same group as the specified data set is not an essential function in the present invention. Specifically, for example, in a case where the specified data set is edited data set that is based on another measurement data set in the group, the initial display image generation unit 33 may acquire a group of other measurement data sets created based on the same original data as the specified data set and also the original data set from the group information DB 37, and generate initial display images only with respect to these data sets. As another situation, in a case where edited data sets that is based on specified data set is present in a group, the initial display image generation unit 33 may acquire a group of measurement data sets created based on the specified data set and generate respective initial display images. These configurations are useful when searching for a measurement data set having the best appearance after performing a number of editing processes on an original measurement data set in which a certain physical quantity is reflected.

Although the workstations 1 and 1a that include the analysis and display programs 22 and 22a, respectively, have been described as examples of the data display processing device for the SPM according to the present invention, the data display processing device for the SPM of the present invention can also be realized by a PC in which the analysis and display programs 22 or 22a is installed.

REFERENCE SIGNS LIST

1, 1a. . . Workstation
10 . . . CPU
100 . . . SPM
111 . . . Sample
112 . . . Sample Stage
113 . . . Scanner
114 . . . Cantilever
115 . . . Probe
116 . . . Scanner Driving Unit
117 . . . Laser Beam Source
118 . . . Lens
119 . . . Beam Splitter
12 . . . Memory
120 . . . Mirror
121 . . . Photodetector
122 . . . Displacement Calculation Unit
14 . . . Monitor
16 . . . Input Unit
18 . . . I/F
20 . . . Storage Unit
21 . . . Measurement Control Program
22, 22a. . . Analysis/Display Program
300 . . . Data Selection Screen
31 . . . Operation Acquisition/Determination Unit
310 . . . Group
311, 312, 313, 314, 315, 316, 317, 318 . . . Measurement Data Thumbnail
32 . . . Specified Data Acquisition Unit
33 . . . Initial Display Image Generation Unit
34 . . . Display Controlling Unit
35 . . . Measurement Data Editing Unit
36 . . . Data Switching Unit
37 . . . Group Information DB
400 . . . Data Display Screen
401 . . . Menu Bar
410 . . . Window
413, 414 . . . Specified Data Image
420 . . . New Window
500, 900 . . . Switching Mark
501, 901 . . . Previous Mark
502, 902 . . . Next Mark
514, 515 . . . Initial Display Image
514i, 515i. . . Additional Information
71 . . . Corresponding Format Image Generation Unit
72 . . . Display Format Switching Unit
C . . . Cursor

The invention claimed is:

1. A data display processing device for a scanning probe microscope that, based on a plurality of measurement data sets that show respective distributions of predetermined physical quantities acquired using a scanning probe microscope, creates a plurality of images that show the distributions of the physical quantities and displays the images on a screen of a display unit, comprising:
   a) a group information storage unit for managing and storing a plurality of measurement data sets by group;
   b) specified data acquisition means for acquiring, from the group information storage unit, a specified data set which is a measurement data set specified by a user;
   c) display controlling means for displaying the specified data set acquired by the specified data acquisition means as an image on the screen;
   d) preliminary image generation means for, triggered by a determination of the specified data set, acquiring other measurement data set or sets belonging to a group in which the specified data set acquired by the specified data acquisition means is included from the group information storage unit, and generating a preliminary image or images which will be used when displaying the other measurement data set or sets on the screen; and
   e) first display switching means for switching to display the preliminary image generated by the preliminary image generation means within a predetermined region on the screen response to a first predetermined input operation by the user that is performed while the specified data set is displayed on the screen.

2. The data display processing device for the scanning probe microscope according to claim 1, wherein the preliminary image generation means acquires all other measurement data sets belonging to the group in which the specified data set is included.

3. The data display processing device for the scanning probe microscope according to claim 1, wherein the predetermined region is a region in which the display controlling means displays the specified data set as an image.

4. The data display processing device for the scanning probe microscope according to claim 1, wherein the display controlling means further displays the other measurement data set linked with the preliminary image as an image in a region different from the region in which the specified data is displayed in response to a confirmation operation by the user performed while the preliminary image is displayed.

5. The data display processing device for the scanning probe microscope according to claim 1, wherein the first display switching means further attaches information pertaining to each measurement data set to the preliminary image to display the information.

6. The data display processing device for the scanning probe microscope according claim 1, further comprising:
f) a display format storage unit for linking one or a plurality of display formats displayable based on each of the plurality of the measurement data sets with each of the measurement data sets and storing them;
g) format-based preliminary image generation means for referring to the display format storage unit and, from among the display formats linked with the specified data set, identifying a display format currently not displayed on the screen or not instructed for displaying, and generating a format-based preliminary image that is an image that is used when displaying the specified data set in the identified display format; and
h) second display switching means for, in accordance with a second predetermined input operation by the user that is performed while the specified data is displayed on the screen, switching to and displaying, in the predetermined region on the screen, the format-based preliminary image generated by the format-based preliminary image generation means.

7. A non-transitory computer readable media recording a control program for causing a computer to function as each means of a data display processing device for a scanning probe microscope according to claim 1.

8. A data display processing method for a scanning probe microscope that, based on a plurality of measurement data sets that show respective distributions of predetermined physical quantities acquired using a scanning probe microscope, creates a plurality of images that show the distributions of the physical quantities and displays the images on a screen of a display unit, the method comprising:
a) a specified data acquisition step of acquiring specified data set which is a measurement data set specified by a user, from a group information storage unit for managing and storing a plurality of measurement data sets for each group;
b) a preliminary image generation step of, triggered by a determination of the specified data set, acquiring other measurement data set or sets belonging to a group in which the specified data set that is acquired in the specified data acquisition step is included from the group information storage unit, and generating a preliminary image which is an image or images which will be used when displaying the other measurement data set or sets on the screen;
c) a display control step of displaying the specified data set acquired in the specified data acquisition step as an image on the screen; and
d) a display switching step of switching to and display the preliminary image generated in the preliminary image generation step in a predetermined region on the screen in response to a first predetermined input operation by the user that is performed while the specified data set is displayed on the screen.

\* \* \* \* \*